No. 855,807. PATENTED JUNE 4, 1907.
J. W. PLATT.
TONGUE TRUCK FOR AGRICULTURAL IMPLEMENTS.
APPLICATION FILED JAN. 18, 1907.
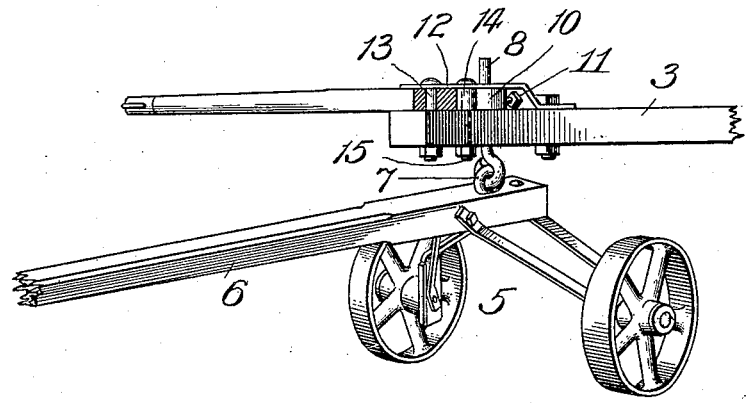
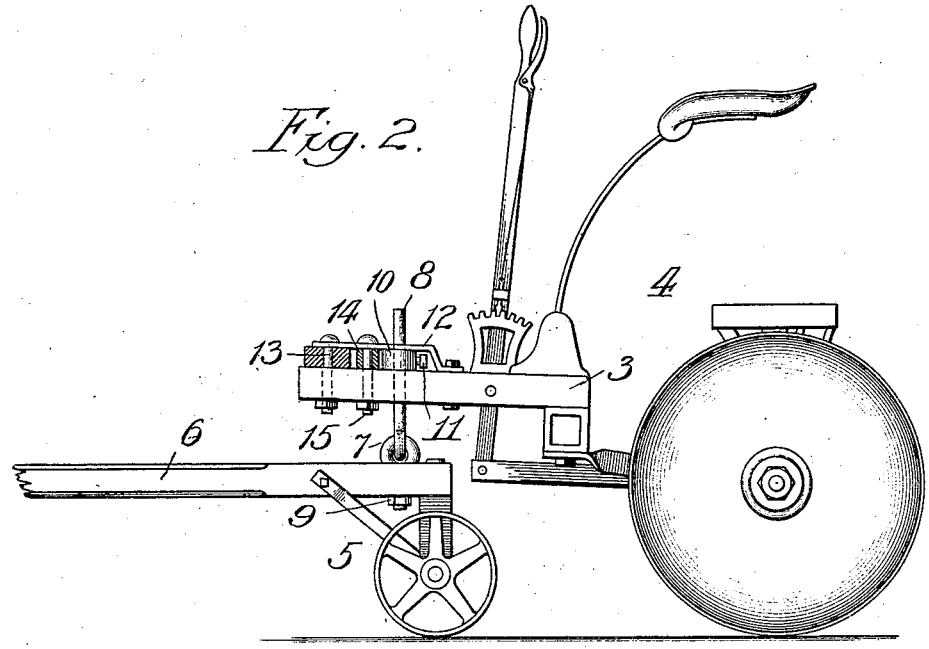
Witnesses:
John Enders
Chas. H. Buell
Inventor:
John W. Platt,
By Dyrenforth, Dyrenforth, Lee & Wiles,
Attys.

UNITED STATES PATENT OFFICE.

JOHN W. PLATT, OF STERLING, ILLINOIS, ASSIGNOR TO STERLING MANUFACTURING COMPANY, OF ROCK FALLS, ILLINOIS, A CORPORATION OF ILLINOIS.

TONGUE-TRUCK FOR AGRICULTURAL IMPLEMENTS.

No. 855,807. Specification of Letters Patent. Patented June 4, 1907.

Application filed January 18, 1907. Serial No. 352,895.

*To all whom it may concern:*

Be it known that I, JOHN W. PLATT, a citizen of the United States, residing at Sterling, in the county of Whiteside and State of Illinois, have invented a new and useful Improvement in Tongue-Trucks for Agricultural Implements, of which the following is a specification.

My invention relates to an improvement in the class of tongue-trucks used on harrows and other agricultural implements for adjustably supporting the tongue proper to prevent its side-whipping tendency and draft-weight on the necks of the animals in pulling the implement.

While my improvement is adapted for use with various kinds of agricultural implements, I have selected for illustrating it a disk-harrow, in connection with which it is shown in the accompanying drawing.

Referring to the drawing: Figure 1 is a broken perspective view showing my improved connection between the truck and stub-tongue of the implement, and Fig. 2 shows a disk-harrow in side elevation containing my improvement.

The stub-tongue, or tongue proper, 3, of the implement, represented as a disk-harrow 4, has flexibly connected with its forward-end portion a tongue-truck 5, involving, as usual, a two-wheeled truck provided with a tongue 6.

My invention consists in the construction of the connection between the tongues 3 and 6, to render it simple and strong and adequately flexible for its purpose, and to adapt it to be adjusted with peculiar facility for raising and lowering the tongue 3 to meet varying conditions in the draft; and following is a description of that construction as illustrated in all its details:

A pair of eye-bolts 7, 8, linked together at their eyes, have one member of the pair passed through the tongue 6, near its rear end, and fastened underneath by a nut 9, and the other member through the forward-end portion of the tongue 3, above which it is surrounded by a stop-collar 10 provided with a set-screw 11, whereby on loosening the set-screw the tongue 3 may be raised or lowered with relation to the tongue 6 for adjusting the draft; and thereupon tightening the set-screw in the raised or lowered position of the collar on the stem of the respective eye-bolt serves to hold the tongues in their relative positions of adjustment.

A desirable feature in my improvement consists in extending the hammer-strap 12 from behind the position of the eye-bolt 8 and there fastening its rear end to the tongue 3, as represented, and thence having it extend over the stop-collar 10 and be penetrated by the upper end of the respective eye-bolt, thereby to constitute the hammer-strap a housing for confining the collar against upward movement while permitting the eye-bolt stem to move, for the aforesaid adjusting purpose, freely through the collar and strap when the set-screw 11 is loosened. With the last-described feature of the construction, it is desirable to reinforce the hammer-strap, which is usually of comparatively light metal, against bending under the draft-strains. This may be done by making it of heavier metal, or, and preferably, by inserting under it, between the eye-bolt 8 and the bolt 13 which connects the free end of the strap with the tongue 3 and affords the evener or whiffle-tree pin, a collar 14 with a bolt 15 passing through it and through the tongue 3 and strap.

What I claim as new and desire to secure by Letters Patent is—

In combination with the tongue of an agricultural implement, a tongue-truck and a flexible and adjustable connection between the two tongues, consisting of a pair of eye-bolts linked together at their eyes, with each member of the pair passing through one of said tongues and fastened, the fastening means for the upper member being a collar loosely surrounding it and provided with a set-screw, a hammer-strap on said implement-tongue extending over said collar and through which the upper eye-bolt passes, an evener-bolt passing through said strap and implement tongue near their forward ends, and a re-inforcing collar under said strap behind said evener-bolt with a bolt passing, to secure it in place, through said strap and implement tongue, the hammer-strap being of a length sufficient to extend over and cover the collar surrounding the upper eye-bolt, the evener-bolt and the re-inforcing collar between the two, as set forth.

JOHN W. PLATT.

In presence of—
   JAMES A. BUYERS,
   THOS. Y. DAVIS.